Jan. 14, 1930.                K. IMHOFF                 1,743,550
              AERATION TANK WITH SUBMERGED CONTACT AERATORS
                         Filed June 18, 1927
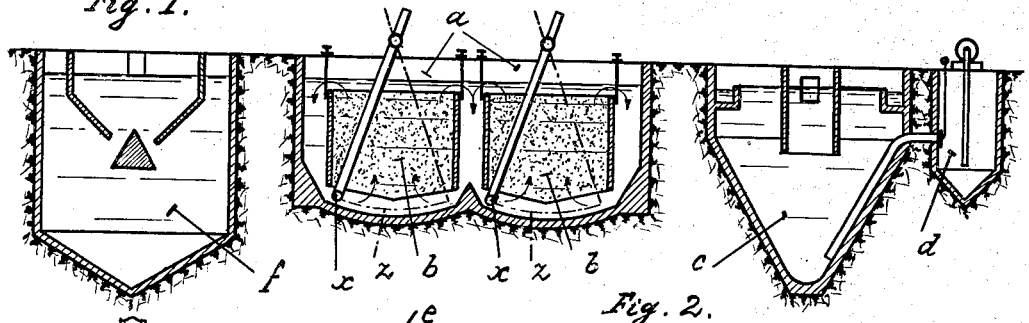
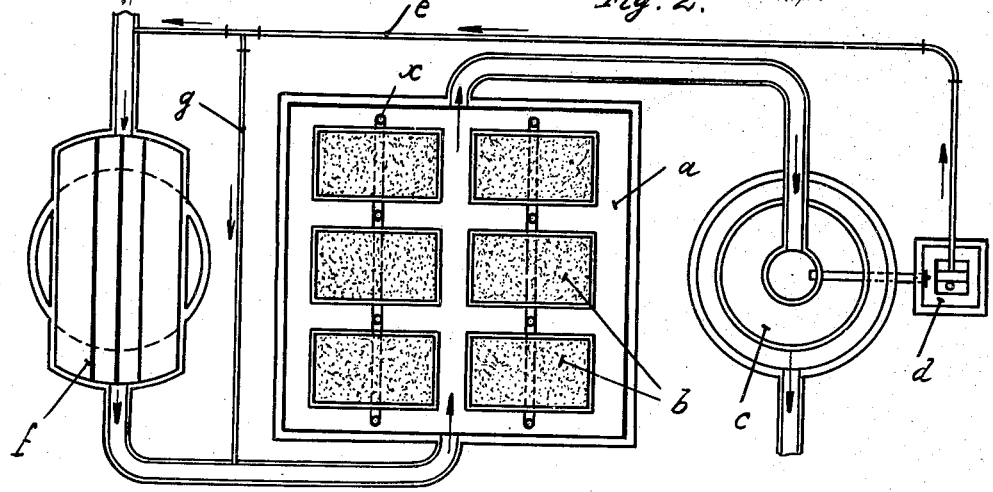
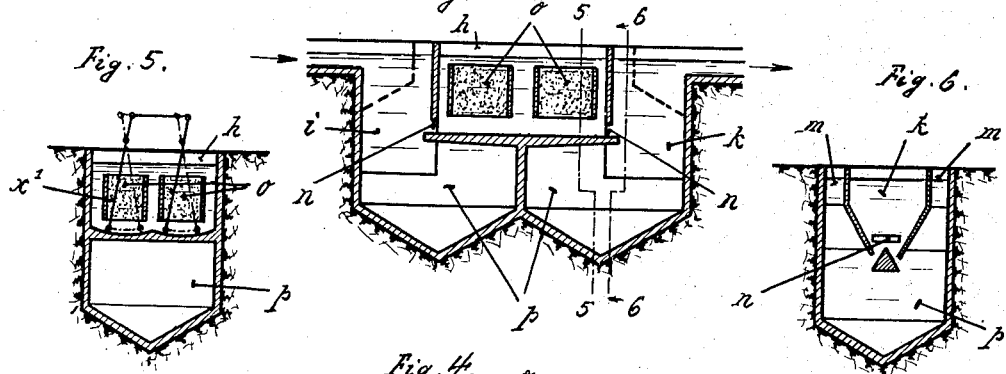
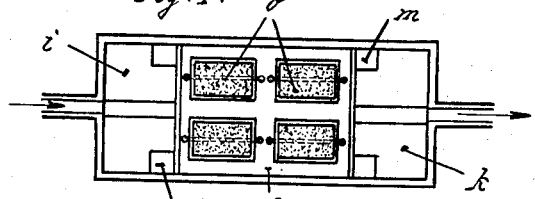

Patented Jan. 14, 1930

1,743,550

UNITED STATES PATENT OFFICE

KARL IMHOFF, OF ESSEN, GERMANY

AERATION TANK WITH SUBMERGED CONTACT AERATORS

Application filed June 18, 1927, Serial No. 199,784, and in Germany July 16, 1926.

In aeration tanks with submerged contact aerators for sewage treatment, the bottom of the tank is generally located rather deep and at such a distance from the lower end of the aerator that the sludge washed out of the latter can settle on the bottom of the tank whence it must be removed from time to time.

The height of the whole aeration plant can be reduced if the bottom of the tank is arranged directly beneath the lower end of the aerator, which requires however an immediate removal of the sludge washed out of the aerator prior to its settling on the tank bottom.

With a supply of air to the submerged contact aerators furnished by means of oscillating air pipes or distributors, said immediate removal of the sludge can, according to the present invention, be obtained by adapting the shape of the bottom of the tank exactly to the path taken by the oscillating air distributors. Thereby, no sludge can settle on the tank bottom because it is continuously swept away by the oscillating air distributors.

This results in a further advantage, for the sludge immediately removed by the oscillating air distributors is again set in motion and caught by the air bubbles and by the water current flowing along with the latter, so that the sludge is passed several times through the aerator. Thereby, the biological cleaning action of the latter is increased because the sludge thus set in motion acts like activated sludge and aids in the sewage treatment.

The accompanying drawing illustrates diagrammatically by way of example in Figs. 1 and 2, in a longitudinal section and in a plan view respectively, a sewage treatment plant embodying the improved aeration tank, while Figs. 3 and 4 show, as a modification, respectively in a longitudinal section and in a plan view, how a two-storied settling and digestion tank can be directly combined with the improved aeration tank: Figs. 5 and 6 showing cross-sections respectively on the lines 5—5 and 6—6 of Fig. 3.

Referring to Figs. 1 and 2:—In an aeration tank $a$ the submerged contact aerators $b$ are so arranged that almost the whole interior of the former is taken up by the latter, oscillating air pipes or distributors $x$ being located beneath the lower ends of said aerators and directly above the bottom of the aeration tank, the shape of said bottom being adapted exactly to the path taken by the oscillating air distributors and indicated by the dotted lines $z$ in Fig. 1.

The sewage treatment plant illustrated in connection with the improved aeration tank comprises further a preliminary Imhoff tank $f$ and a secondary settler $c$, the sludge from the latter being preferably led through the pump $d$, either, through the pipe $e$ into the preliminary tank $f$ where it can be digested with the other sludge therein, or, through the pipe $g$ again back to the aeration tank $a$ so that the quantity of activated sludge passed through the aerators can be further increased.

As shown in Figs. 3 to 6, the whole aeration plant can also be arranged directly within a two-storied settling and digestion tank.

The bottom of the aeration tank $h$ with the aerators $o$ therein, is again adapted exactly to the path taken by the oscillating air distributors $x'$. In front of the aeration tank a preliminary tank $i$ and behind the same a secondary settler $k$, and beneath all of them a sludge digestion chamber $p$, are arranged, gas channels $m$ issuing from the latter, while apertures $n$ serve for the passage of the sewage through the aeration tank as well as of the sludge washed out of the aerators down to the digestion chamber.

What I claim is:—

1. An aeration tank for sewage treatment containing a contact aerator, the bottom of the aerator being in proximity to the bottom of the tank, and an oscillating air distributor in the tank and having a part which moves in the space between the bottom of the aerator and the bottom of the tank, the shape of the bottom of the tank conforming to the path described by said portion.

2. The aeration tank and aerator as specified in claim 1, and a two-storied settling and digesting tank in which the aeration tank containing one or more of said aerators is disposed, said settling and digesting tank containing a preliminary chamber and a secondary settler, said chamber and said settler each containing beneath the aeration tank a sludge digesting chamber, said aeration tank having apertures to communicate with said preliminary chamber and said secondary settler.

In testimony whereof I have hereunto set my hand:

KARL IMHOFF.